(12) United States Patent
Furiya et al.

(10) Patent No.: US 11,742,699 B2
(45) Date of Patent: Aug. 29, 2023

(54) POWER FEEDING DEVICE AND POWER FEEDING SYSTEM

(71) Applicants: IHI Corporation, Tokyo (JP); Incorporated Educational Institution Tohoku Gakuin, Sendai (JP)

(72) Inventors: Kentaro Furiya, Tokyo (JP); Kenji Nishimura, Tokyo (JP); Motonao Niizuma, Tokyo (JP); Fumihiro Sato, Tagajo (JP); Tomohiro Sawa, Tagajo (JP)

(73) Assignees: IHI CORPORATION; INCORPORATED EDUCATIONAL INSTITUTION TOHOKU GAKUIN, Sendai (JP)

( * ) Notice: Subject to any disclaimer, the term of this patent is extended or adjusted under 35 U.S.C. 154(b) by 0 days.

(21) Appl. No.: 17/683,536

(22) Filed: Mar. 1, 2022

(65) Prior Publication Data
US 2022/0285992 A1 Sep. 8, 2022

(30) Foreign Application Priority Data
Mar. 3, 2021 (JP) .................. 2021-033368

(51) Int. Cl.
*H02J 50/12* (2016.01)
*H02J 50/40* (2016.01)
(Continued)

(52) U.S. Cl.
CPC .............. *H02J 50/12* (2016.02); *B60L 53/12* (2019.02); *H02J 50/005* (2020.01);
(Continued)

(58) Field of Classification Search
CPC ........ H02J 50/12; H02J 50/005; H02J 50/402; H02J 50/90; H02J 2310/44; B60L 53/12; B60L 2200/10
See application file for complete search history.

(56) References Cited

U.S. PATENT DOCUMENTS 11,394,247 B1 * 7/2022 Tsibulevskiy ........... H02J 50/80
2011/0241439 A1 * 10/2011 Urano .................... H02J 50/502
307/104

(Continued)

FOREIGN PATENT DOCUMENTS

JP 2012-175896 A 9/2012
JP 2014-222975 A 11/2014
(Continued)

*Primary Examiner* — Daniel Kessie
*Assistant Examiner* — Brian K Baxter
(74) *Attorney, Agent, or Firm* — Volpe Koenig (57) ABSTRACT

A power feeding device performing wireless power feeding to a flying object includes: a power feeding unit performing power feeding to the flying object disposed at a power feeding position; a power transmission coil provided in the power feeding unit and generating a magnetic field by energization; a relay coil provided in the power feeding unit, receiving the magnetic field generated from the power transmission coil and magnetically coupled to the power transmission coil, and magnetically coupled to a power receiving coil provided in the flying object in a case where the flying object is positioned at the power feeding position; and a second magnetic body provided in the power feeding unit and used for magnetic coupling between the relay coil and the power receiving coil.

14 Claims, 7 Drawing Sheets

(51) Int. Cl.
  *H02J 50/00* (2016.01)
  *B60L 53/12* (2019.01)
  *H02J 50/90* (2016.01)

(52) U.S. Cl.
  CPC ............ *H02J 50/402* (2020.01); *H02J 50/90* (2016.02); *B60L 2200/10* (2013.01); *H02J 2310/44* (2020.01)

(56) References Cited

U.S. PATENT DOCUMENTS

| | | | | |
|---|---|---|---|---|
| 2012/0223586 | A1* | 9/2012 | Gotani | H02J 50/12 307/104 |
| 2012/0223594 | A1* | 9/2012 | Gotani | H02J 50/12 307/104 |
| 2012/0318586 | A1* | 12/2012 | Atarashi | B60L 53/39 180/2.1 |
| 2014/0354220 | A1* | 12/2014 | Liu | H02J 50/50 320/108 |
| 2015/0332847 | A1* | 11/2015 | Omori | H02J 50/70 307/104 |
| 2016/0013664 | A1 | 1/2016 | Maekawa et al. | |
| 2017/0001531 | A1 | 1/2017 | Takatsu et al. | |
| 2017/0279315 | A1* | 9/2017 | Sakata | H02J 50/50 |
| 2018/0138745 | A1* | 5/2018 | Maud | H02J 50/10 |
| 2018/0241259 | A1 | 8/2018 | Maekawa et al. | |
| 2018/0261383 | A1* | 9/2018 | Chiyo | H01F 27/36 |
| 2018/0323655 | A1* | 11/2018 | Hosotani | H02J 50/12 |
| 2019/0348871 | A1 | 11/2019 | Sakata et al. | |
| 2020/0084999 | A1* | 3/2020 | Yoo | B67D 3/0003 |
| 2020/0169117 | A1 | 5/2020 | Okamoto et al. | |
| 2020/0227950 | A1* | 7/2020 | Lim | G06F 1/263 |
| 2021/0167636 | A1* | 6/2021 | Sherman | H02J 50/60 |
| 2021/0273490 | A1 | 9/2021 | Okamoto et al. | |
| 2021/0273491 | A1 | 9/2021 | Okamoto et al. | |
| 2022/0182102 | A1* | 6/2022 | Park | H02J 50/40 |

FOREIGN PATENT DOCUMENTS

| | | |
|---|---|---|
| JP | 2015-165746 A | 9/2015 |
| JP | 2015-177715 A | 10/2015 |
| JP | 2015-186310 A | 10/2015 |
| JP | 2016-039718 A | 3/2016 |
| JP | 2017-028770 A | 2/2017 |
| JP | 2017-050954 A | 3/2017 |
| JP | 2017-135880 A | 8/2017 |
| JP | 2017-175903 A | 9/2017 |
| JP | 2017-212830 A | 11/2017 |
| JP | 2018-120796 A | 8/2018 |
| JP | 2018-191474 A | 11/2018 |
| JP | 2019-033598 A | 2/2019 |

* cited by examiner

POWER FEEDING DEVICE AND POWER FEEDING SYSTEM

TECHNICAL FIELD

The present disclosure relates to a power feeding device and a power feeding system.

BACKGROUND

A power feeding device and a power feeding system for a multicopter as a power feeding target is described in, for example, Japanese Unexamined Patent Publication No. 2017-135880. The power feeding device and the power feeding system of Japanese Unexamined Patent Publication No. 2017-135880 supply electric power to the multicopter. The power feeding system lands the multicopter at a station equipped with a power transmission coil. The power feeding system supplies electric power to the multicopter by magnetically coupling a power receiving coil on the multicopter side to the power transmission coil on the station side.

In a case where electric power is supplied using magnetic coil coupling, the target of the power feeding needs to be equipped with a power receiving coil. The weight of the power feeding target increases when the power feeding target is equipped with a component such as the power receiving coil. For example, in a case where the power feeding target is a movable object, the movable object should be light in weight. It is also desirable to reduce the weight even in a case where the power feeding target is a portable device.

In this regard, it is desired to develop a power feeding device and a power feeding system capable of reducing the weight of a power feeding target.

SUMMARY

A power feeding device according to one aspect of the present disclosure performs wireless power feeding to a power feeding target. The power feeding device includes: a power feeding unit performing power feeding to the power feeding target disposed at a power feeding position; a power transmission coil provided in the power feeding unit and generating a magnetic field by energization; a relay coil provided in the power feeding unit, receiving the magnetic field generated from the power transmission coil and magnetically coupled to the power transmission coil, and magnetically coupled to a power receiving coil provided in the power feeding target in a case where the power feeding target is positioned at the power feeding position; and a magnetic body provided in the power feeding unit and used for magnetic coupling between the relay coil and the power receiving coil.

A power feeding system according to one aspect of the present disclosure performs wireless power feeding to a power feeding target. The power feeding system includes: a power receiving coil provided in the power feeding target; a power feeding unit performing power feeding to the power feeding target disposed at a power feeding position; a power transmission coil provided in the power feeding unit and generating a magnetic field by energization; a relay coil provided in the power feeding unit, receiving the magnetic field generated from the power transmission coil and magnetically coupled to the power transmission coil, and magnetically coupled to the power receiving coil in a case where the power feeding target is positioned at the power feeding position; and a magnetic body provided in the power feeding unit and used for magnetic coupling between the relay coil and the power receiving coil.

According to the power feeding device and the power feeding system of the present disclosure, the weight of a power feeding target can be reduced.

DETAILED DESCRIPTION

[1] Overview of Embodiment

A power feeding device according to one aspect of the present disclosure performs wireless power feeding to a power feeding target. The power feeding device includes: a power feeding unit performing power feeding to the power feeding target disposed at a power feeding position; a power transmission coil provided in the power feeding unit and generating a magnetic field by energization; a relay coil provided in the power feeding unit, receiving the magnetic field generated from the power transmission coil and magnetically coupled to the power transmission coil, and magnetically coupled to a power receiving coil provided in the power feeding target in a case where the power feeding target is positioned at the power feeding position; and a magnetic body provided in the power feeding unit and used for magnetic coupling between the relay coil and the power receiving coil. The relay coil is provided in the power feeding unit of the power feeding device. The power feeding device is capable of magnetically coupling the power receiving coil to the power transmission coil via the relay coil. The power feeding device includes the magnetic body for magnetically coupling the relay coil to the power receiving coil. As a result, the magnetic coupling between the relay coil and the power receiving coil is enhanced. Accordingly, a decline in power feeding efficiency can be suppressed. With the power feeding device, a decline in power feeding efficiency can be suppressed and magnetic body installation on the back side of the power receiving coil can be omitted. Accordingly, as for the power feeding device, it is not necessary to install a magnetic body for magnetic coupling in the power feeding target. As a result, the weight of the power feeding target can be reduced.

The power receiving coil of the power feeding device according to one aspect of the present disclosure may be formed smaller than the relay coil. The power receiving coil may be disposed on an inner peripheral side of the relay coil in a case where the power feeding target is positioned at the power feeding position. The power receiving coil is disposed on the inner peripheral side of the relay coil in a case where the power feeding target is positioned at the power feeding position. As a result, the magnetic coupling between the relay coil and the power receiving coil can be strengthened. Accordingly, the efficiency of power feeding can be enhanced. Further, the power receiving coil can be configured smaller than the relay coil. Accordingly, with the power feeding device, the weight of the power feeding target equipped with the power receiving coil can be reduced.

The power transmission coil and the relay coil of the power feeding device according to one aspect of the present disclosure may be provided coaxially. The power receiving coil, the power transmission coil, and the relay coil may be coaxially disposed in a case where the power feeding target is positioned at the power feeding position. In this case, the power receiving coil, the power transmission coil, and the relay coil are coaxially disposed in a case where the power feeding target is positioned at the power feeding position. As a result, the power receiving coil can be strongly magnetically coupled to the power transmission coil via the relay coil. Accordingly, the efficiency of power feeding can be enhanced.

The power feeding target of the power feeding device according to one aspect of the present disclosure may be a flying object. In this case, the weight of the flying object as the power feeding target can be reduced.

A power feeding system according to one aspect of the present disclosure performs wireless power feeding to a power feeding target. The power feeding system includes: a power receiving coil provided in the power feeding target; a power feeding unit performing power feeding to the power feeding target disposed at a power feeding position; a power transmission coil provided in the power feeding unit and generating a magnetic field by energization; a relay coil provided in the power feeding unit, receiving the magnetic field generated from the power transmission coil and magnetically coupled to the power transmission coil, and magnetically coupled to the power receiving coil in a case where the power feeding target is positioned at the power feeding position; and a magnetic body provided in the power feeding unit and used for magnetic coupling between the relay coil and the power receiving coil. The relay coil is provided in the power feeding unit of the power feeding system. As a result, the power receiving coil can be magnetically coupled to the power transmission coil via the relay coil. The power feeding system includes the magnetic body magnetically coupling the relay coil to the power receiving coil. As a result, the magnetic coupling between the relay coil and the power receiving coil is enhanced, and thus a decline in power feeding efficiency can be suppressed. Accordingly, with the power feeding system, a decline in power feeding efficiency can be suppressed and magnetic body installation on the back side of the power receiving coil can be omitted. Accordingly, as for the power feeding system, it is not necessary to install a magnetic body for magnetic coupling in the power feeding target. As a result, the weight of the power feeding target can be reduced.

[2] Exemplification of Embodiment

Hereinafter, the power feeding device and the power feeding system of the present disclosure will be described with reference to the drawings. In the description of the drawings, the same elements are denoted by the same reference numerals with redundant description omitted.

Figure 1:
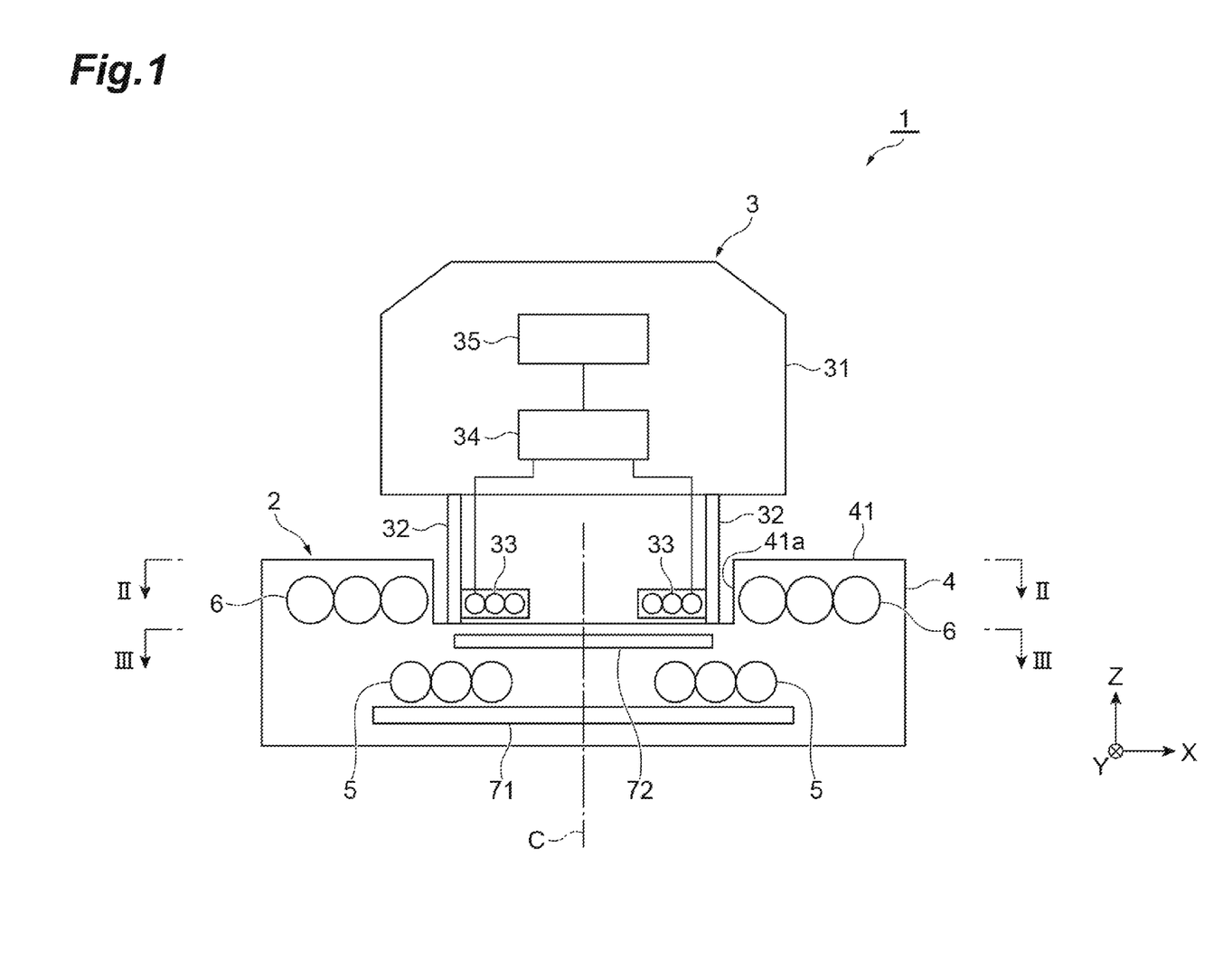
FIG. 1 is a schematic diagram illustrating the configuration of a power feeding device and a power feeding system of the present disclosure.

FIG. 1 is a schematic diagram illustrating the configuration of the power feeding system and the power feeding device of the present disclosure. A power feeding system 1 is configured by a power feeding device 2 and a flying object 3. The power feeding device 2 performs wireless power feeding to the flying object 3. The power feeding method that is adopted by the power feeding system 1 and the power feeding device 2 is, for example, an electromagnetic induction method, a magnetic field resonance method, or the like. The flying object 3 is a power feeding target. The flying object 3 is an unmanned aerial vehicle (hereinafter, referred to as a UAV) that flies by remote control or the like. For example, the flying object 3 is a multicopter provided with a plurality of rotors. The flying object 3 is a so-called drone. The power feeding device 2 includes a power feeding unit 4, power transmission coils 5, relay coils 6, a first magnetic body 71, and a second magnetic body 72.

As illustrated in FIG. 1, the power feeding unit 4 performs power feeding to the flying object 3 positioned at a power feeding position. The power feeding unit 4 has, for example, a box body in which the flying object 3 or the like can be accommodated. The power feeding unit 4 has a size at which the flying object 3 is capable of landing. An upper surface 41 of the power feeding unit 4 is configured such that the flying object 3 is capable of landing. For example, the upper surface 41 has a recessed portion 41a recessed downward. The recessed portion 41a has a size at which leg portions 32 of the flying object 3 can be accommodated. The recessed portion 41a is formed so as to be capable of accommodating all of the plurality of leg portions 32 extending downward from a main body 31 of the flying object 3. In FIG. 1, the position where the recessed portion 41a is formed is the power feeding position of the flying object 3.

The power transmission coil 5 is provided in the power feeding unit 4. The power transmission coil 5 generates a magnetic field by energization (electric power feeding). The coil means a winding wire. The coil referred to in this specification does not include a magnetic member for magnetic flux concentration. The power transmission coil 5 is installed in the power feeding unit 4. The power transmission coil 5 is installed at a position below the recessed portion 41a. The power transmission coil 5 is configured by, for example, annularly winding a wire rod. The power transmission coils 5 are disposed around an axis C extending in the vertical direction. The axis C passes through the middle of the power feeding position of the flying object 3. The power transmission coil 5 generates a magnetic field by energization. The power transmission coil 5 is connected to a power transmission circuit. The power transmission coil 5 generates a magnetic field in the direction along the axis C by being supplied with alternating current electric power from the power transmission circuit.

The relay coil 6 is provided in the power feeding unit 4. The relay coils 6 are disposed around the axis C and coaxially with the power transmission coil 5. The relay coil 6 receives the magnetic field that is generated from the power transmission coil 5. The relay coil 6 is magnetically coupled to the power transmission coil 5. The relay coil 6 is installed in the power feeding unit 4. The relay coil 6 is installed so as to surround the periphery of the recessed portion 41a. The relay coil 6 is configured by, for example, annularly winding a wire rod. The relay coil 6 is provided so as to penetrate the recessed portion 41a in the middle. The relay coils 6 relay the magnetic coupling between the power transmission coils 5 and power receiving coils 33.

The first magnetic body 71 is provided in the power feeding unit 4. The first magnetic body 71 is used for magnetic coupling between the power transmission coil 5 and the relay coil 6. The first magnetic body 71 is disposed on the back side of the power transmission coil 5. The first magnetic body 71 is disposed below the power transmission coil 5. The first magnetic body 71 is disposed so as to be parallel to the upper surface 41. The first magnetic body 71 is disposed on the back side with respect to the relay coil 6 magnetically coupled to the power transmission coil 5. The magnetic field that is generated by the power transmission coil 5 is formed toward the relay coil 6 side by the first magnetic body 71. As a result, the magnetic coupling between the power transmission coil 5 and the relay coil 6 is enhanced. The first magnetic body 71 is a plate-shaped magnetic material. The first magnetic body 71 is configured by, for example, a disk-shaped ferrite.

The second magnetic body 72 is provided in the power feeding unit 4. The second magnetic body 72 is disposed between the power transmission coil 5 and the power receiving coil 33. The second magnetic body 72 is used for magnetic coupling between the relay coil 6 and the power receiving coil 33. The second magnetic body 72 is a plate-shaped magnetic material. The second magnetic body 72 is configured by, for example, a disk-shaped ferrite. The second magnetic body 72 is parallel to the upper surface 41. The second magnetic body 72 is provided at a position below the power receiving coil 33 in a case where the flying object 3 is positioned at the power feeding position. The second magnetic body 72 is provided at a position above the power transmission coil 5. The inductance of the power receiving coil 33 increases by providing the second magnetic body 72 below the power receiving coil 33. As a result, the Q value of the power receiving coil 33 can be increased.

The flying object 3 includes the power receiving coil 33, a charging circuit 34, and a battery 35. The power receiving coil 33 is magnetically coupled to the relay coil 6 when electric power is supplied. The power receiving coil 33 is provided in the lower portion of the flying object 3. For example, the power receiving coil 33 is attached to the leg portion 32 extending downward from the main body 31 of the flying object 3. The power receiving coil 33 is configured by, for example, annularly winding a wire rod. The power receiving coils 33 are provided such that the vertical direction is the center thereof when the flying object 3 lands. The power receiving coil 33 is disposed in the recessed portion 41*a* in a case where the flying object 3 is positioned at the power feeding position. The power receiving coil 33 is disposed inside the relay coil 6 in a case where the flying object 3 is positioned at the power feeding position. The power receiving coils 33 are disposed around the axis C and coaxially with the relay coil 6 and the power transmission coil 5. The position of the power receiving coil 33 along the axis C is the same as the position of the relay coil 6 along the axis C. The height of the power receiving coil 33 is the same as the height of the relay coil 6. The power receiving coil 33 is disposed concentrically with respect to the relay coil 6. The magnetic coupling between the relay coil 6 and the power receiving coil 33 can be enhanced. Being coaxial also includes being substantially coaxial to the extent that the efficiency of power feeding does not decline by a predetermined level or more. Being concentric also includes being substantially concentric to the extent that the efficiency of power feeding does not decline by a predetermined level or more. The power receiving coil 33 is magnetically coupled to the relay coil 6. The power receiving coil 33 generates an induced electromotive force by magnetic coupling. The power receiving coil 33 is connected to the charging circuit 34. The battery 35 is charged via the charging circuit 34 with the electric power generated at the power receiving coil 33. The charging circuit 34 and the battery 35 are accommodated in, for example, the main body 31 of the flying object 3. A plurality of rotors are attached to the main body 31 of the flying object 3. The flying object 3 flies by rotor rotation.

Figure 2:
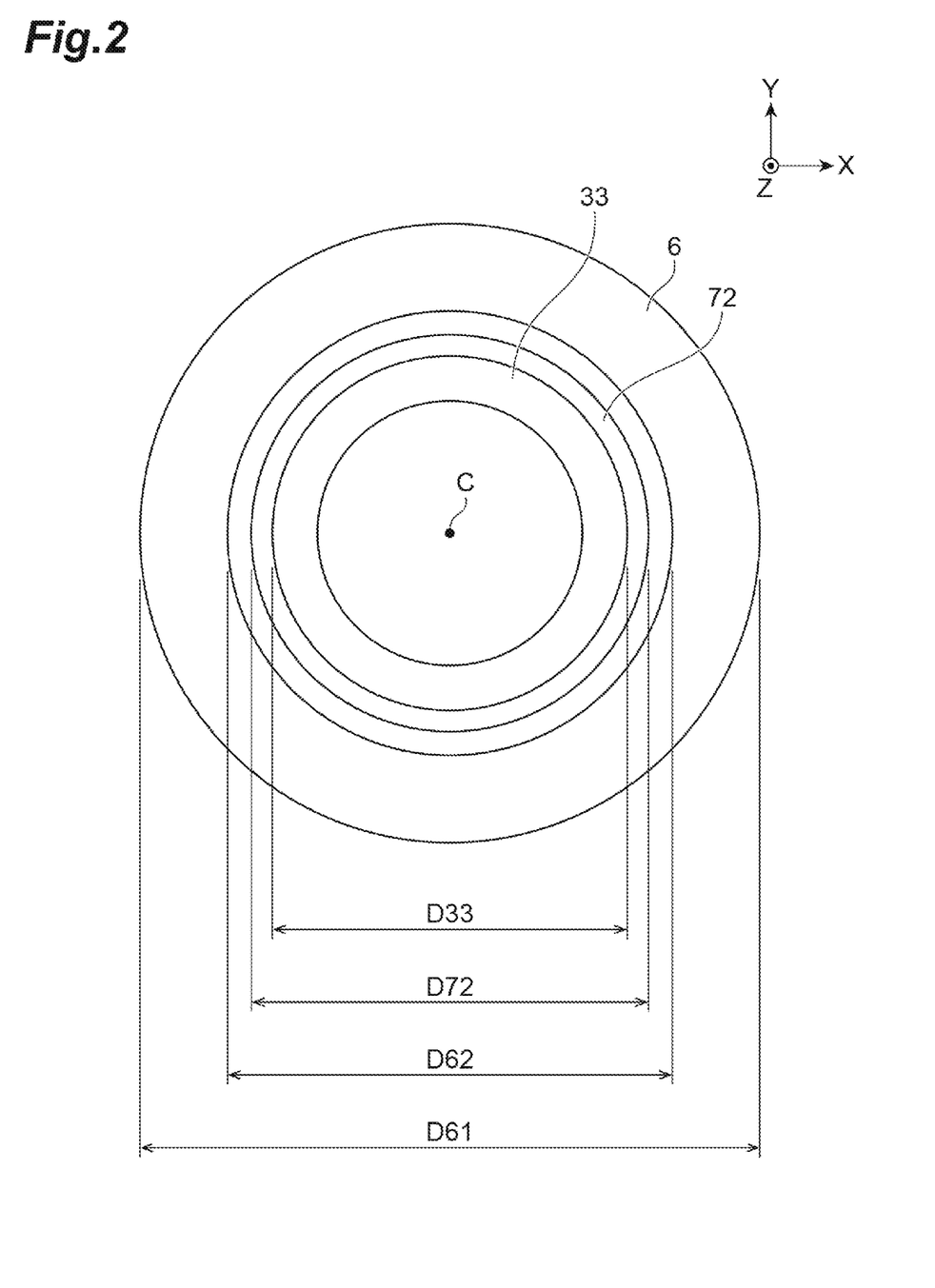
FIG. 2 is a schematic diagram of the horizontal cross section of the power feeding device in II-II of FIG. 1.
Figure 3:
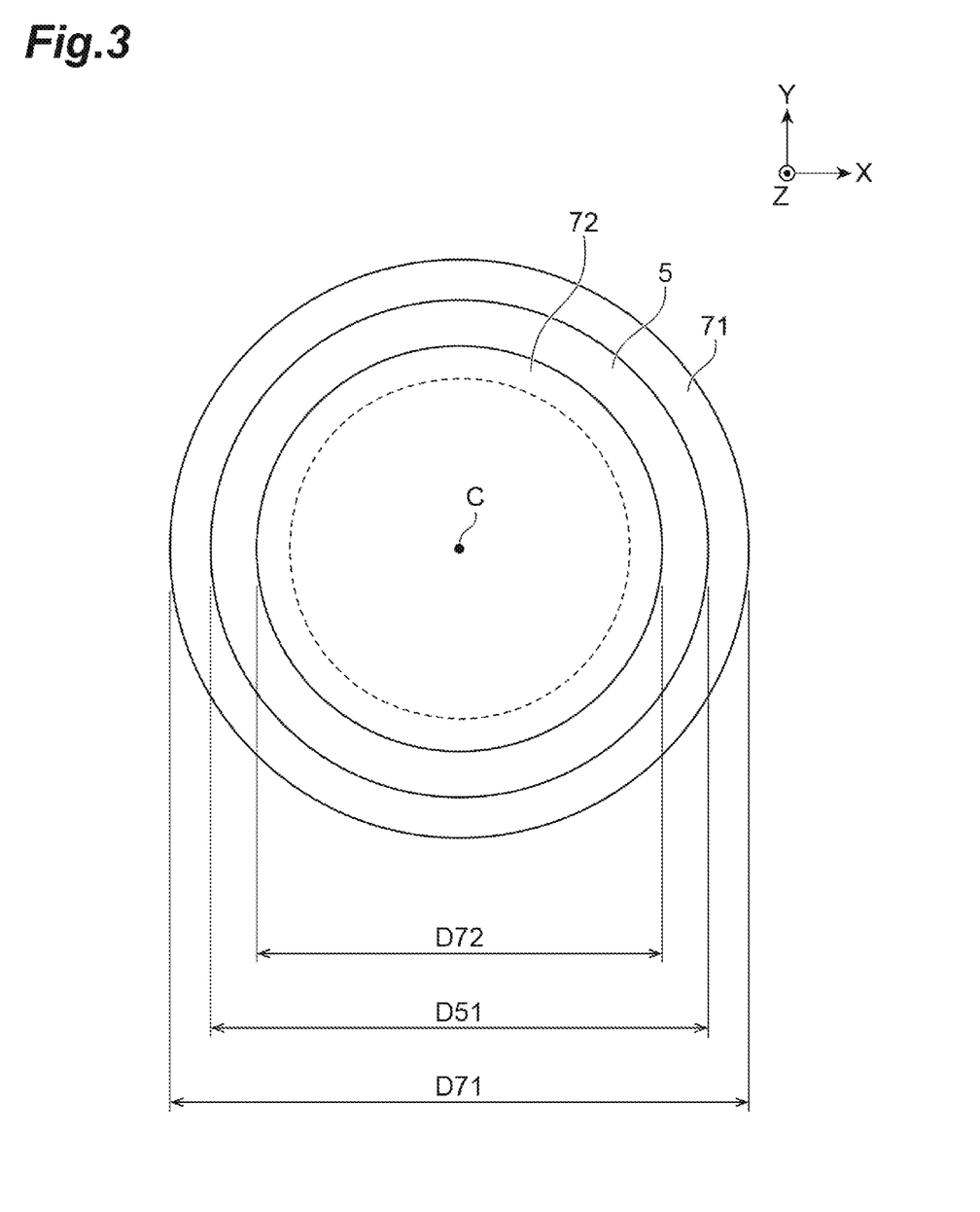
FIG. 3 is a schematic diagram of the horizontal cross section of the power feeding device in III-III of FIG. 1.

FIG. 2 is a schematic diagram of the horizontal cross section of the power feeding device 2 in II-II of FIG. 1. FIG. 3 is a schematic diagram of the horizontal cross section of the power feeding device 2 in III-III of FIG. 1. FIGS. 2 and 3 are diagrams illustrating the sizes of the power transmission coil 5, the relay coil 6, the first magnetic body 71, and the second magnetic body 72. For convenience of description, cross sections of the housing of the power feeding unit 4 and the leg portion 32 of the flying object 3 are not illustrated in FIGS. 2 and 3.

As illustrated in FIGS. 2 and 3, the power transmission coil 5, the relay coil 6, the first magnetic body 71, and the second magnetic body 72 are coaxially disposed around the axis C. In a case where the flying object 3 is positioned at the power feeding position, the power transmission coil 5, the relay coil 6, the first magnetic body 71, the second magnetic body 72, and the power receiving coil 33 are coaxially disposed around the axis C.

In FIG. 2, the power receiving coil 33 is positioned on the inner peripheral side of the relay coil 6. The second magnetic body 72 is positioned below the power receiving coil 33. In a case where the flying object 3 is positioned at the power feeding position, the power receiving coil 33 is positioned on the inner peripheral side of the relay coil 6. An inner diameter D62 of the relay coil 6 is a size equal to or greater than an outer diameter D33 of the power receiving coil 33. The inner diameter D62 of the relay coil 6 and the outer diameter D33 of the power receiving coil 33 are set such that the relay coil 6 and the power receiving coil 33 are substantially coaxial even in a case where the position of the flying object 3 deviates from an appropriate power feeding position. An outer diameter D61 of the relay coil 6 is larger than an outer diameter D72 of the second magnetic body 72. The outer diameter D72 of the second magnetic body 72 is larger than the outer diameter D33 of the power receiving coil 33. The relay coil 6 and the power transmission coil 5 can be magnetically coupled to each other by the outer diameter D61 of the relay coil 6 being larger than the outer diameter D72 of the second magnetic body 72.

In FIG. 3, the power transmission coil 5 is positioned below the second magnetic body 72. The first magnetic body 71 is positioned below the power transmission coil 5. The broken line in FIG. 3 indicates the inside edge of the power transmission coil 5. An outer diameter D51 of the power transmission coil 5 is larger than the outer diameter D72 of the second magnetic body 72. The power transmission coil 5 and the relay coil 6 can be magnetically coupled to each other. An outer diameter D71 of the first magnetic body 71 is larger than the outer diameter D51 of the power transmission coil 5. As a result, the magnetic coupling between the power transmission coil 5 and the relay coil 6 can be enhanced.

Figure 4:
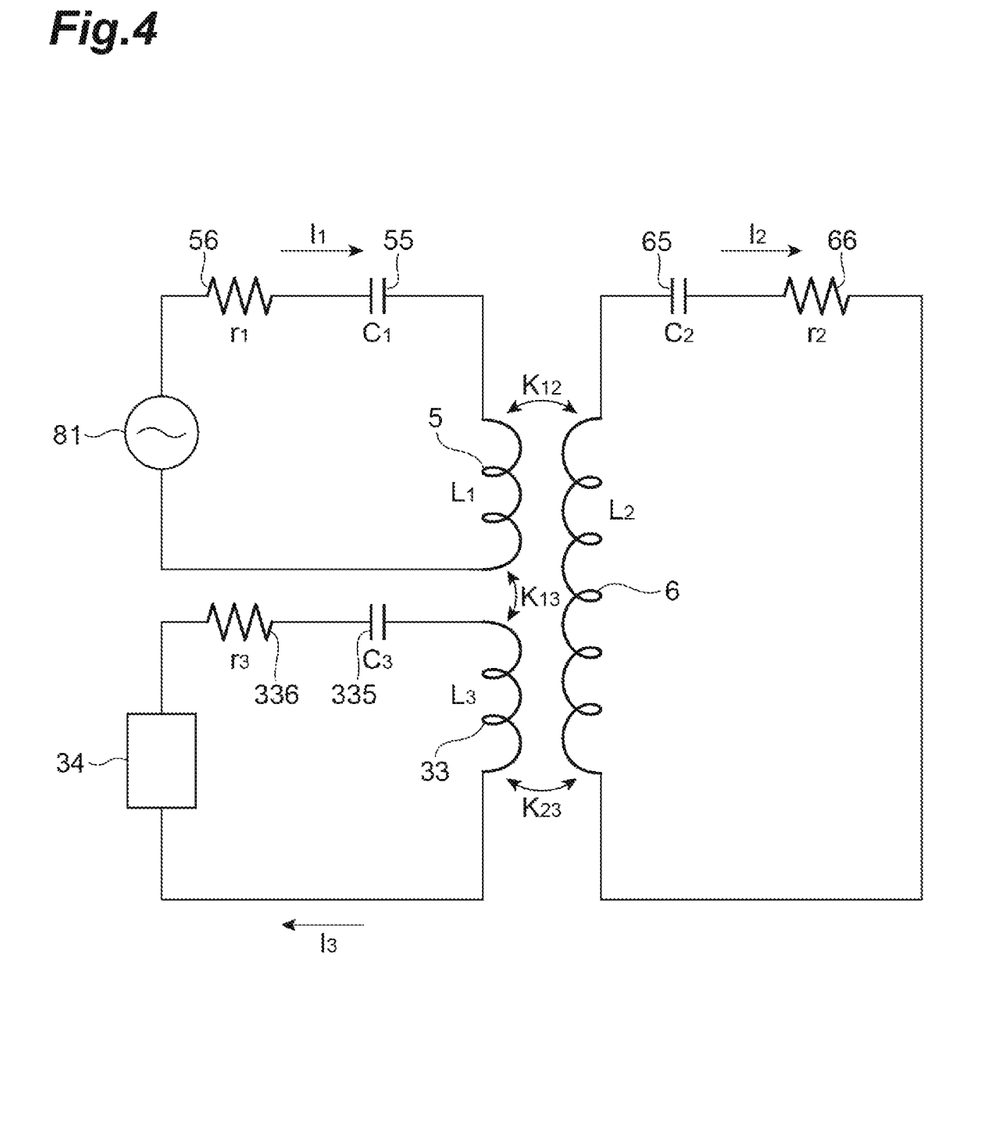
FIG. 4 is a diagram illustrating an equivalent circuit of a coil in the power feeding device and the power feeding system of FIG. 1.

FIG. 4 is an equivalent circuit illustrating a state where the power transmission coil 5, the relay coil 6, and the power receiving coil 33 are coupled. The power transmission coil 5 is connected to a power transmission circuit 81. The power transmission coil 5 receives alternating current electric power. A capacitor 55 is connected in series to the power transmission coil 5. A resonance frequency is determined by a capacitance C1 of the capacitor 55 and an inductance L1 of the power transmission coil 5. An electrical resistance value of the winding wire of the power transmission coil 5 is r1 and is represented as a resistor 56. The relay coil 6 is magnetically coupled to the power transmission coil 5. The relay coil 6 generates an induced electromotive force by magnetic coupling. A capacitor 65 is connected in series to the relay coil 6. A resonance frequency is determined by a capacitance C2 of the capacitor 65 and an inductance L2 of the relay coil 6. An electrical resistance value of the winding wire of the relay coil is r2 and is represented as a resistor 66. A coupling coefficient $K_{12}$ between the power transmission coil 5 and the relay coil 6 is determined mainly by, for example, the positions and sizes of the power transmission coil 5, the relay coil 6, the first magnetic body 71, and the second magnetic body 72.

The power receiving coil 33 is magnetically coupled to the relay coil 6. The power receiving coil 33 generates an induced electromotive force by magnetic coupling. The power receiving coil 33 is connected to the charging circuit 34. The battery 35 is charged through the charging circuit 34 with the electric power generated by the induced electromotive force. A capacitor 335 is connected in series to the power receiving coil 33. A resonance frequency is determined by a capacitance C3 of the capacitor 335 and an inductance L3 of the power receiving coil 33. An electrical resistance value of the winding wire of the power receiving coil 33 is r2 and is represented as a resistor 336. The resonance frequencies of the power transmission coil 5, the relay coil 6, and the power receiving coil 33 are set to be identical or substantially identical. A coupling coefficient $K_{23}$ between the power receiving coil 33 and the relay coil 6 is determined mainly by, for example, the positional relationships and sizes of the power receiving coil 33, the relay coil 6, and the second magnetic body 72. The coupling coefficient $K_{12}$ between the power receiving coil 33 and the power transmission coil 5 is determined mainly by, for example, the positional relationships and sizes of the power receiving coil 33, the power transmission coil 5, the first magnetic body 71, and the second magnetic body 72.

The relationship between the coupling coefficient $K_{12}$, the coupling coefficient $K_{23}$, and a coupling coefficient $K_{13}$ will be described. The coupling coefficient $K_{23}$ is larger than the coupling coefficient $K_{13}$. The coupling coefficient $K_{23}$ is larger than the coupling coefficient $K_{12}$. With such a relationship, the efficiency of power feeding can be enhanced even with the power receiving coil 33 reduced in size. As illustrated in FIG. 1, the power receiving coil 33 is disposed inside the relay coil 6. As a result, the coupling coefficient $K_{23}$ can be increased. A decline in the coupling coefficient $K_{23}$ can be suppressed even in a case where the landing position of the flying object 3 deviates from an appropriate power feeding position. Accordingly, a decline in power feeding efficiency can be suppressed.

In FIG. 4, a matching circuit (resonance circuit) is configured by connecting a capacitor in series to the power transmission coil 5, the relay coil 6, and the power receiving coil 33. Alternatively, a matching circuit may be configured by connecting a capacitor in parallel to at least one of the power transmission coil 5, the relay coil 6, and the power receiving coil 33.

The operation of the power feeding device 2 and the power feeding system 1 of the present disclosure will be described.

As illustrated in FIG. 1, the flying object 3 that flies is landed on the power feeding unit 4 so that electric power is supplied to the flying object 3. The flying object 3 lands at the power feeding position of the power feeding unit 4 by, for example, remote flight control. The flying object 3 lands in the recessed portion 41a, which is the power feeding position. The power receiving coil 33 attached to the leg portion 32 of the flying object 3 is disposed in the recessed portion 41a. The power receiving coil 33 is disposed inside the relay coil 6 provided in the power feeding unit 4. The relay coil 6 and the power receiving coil 33 are coaxially disposed around the axis C. The relay coil 6 and the power receiving coil 33 are concentrically disposed at the same height. The magnetic coupling between the relay coil 6 and the power receiving coil 33 is high.

Electric power is supplied to the flying object 3 by operating the power feeding device 2. An alternating current voltage is applied to the power transmission coil 5 from the power transmission circuit 81. As a result, the power transmission coil 5 is energized. The power transmission coil 5 generates a magnetic field along the axis C. The first magnetic body 71 is disposed below the power transmission coil 5. The magnetic field generated by the power transmission coil 5 is formed above the power transmission coil 5. The second magnetic body 72 is disposed between the power transmission coil 5 and the power receiving coil 33. The power transmission coil 5 is formed larger than the second magnetic body 72. As a result, the magnetic field generated from the power transmission coil 5 is formed toward the relay coil 6.

The relay coil 6 receives the magnetic field generated from the power transmission coil 5 and is magnetically coupled to the power transmission coil 5. As a result, the relay coil 6 generates an induced electromotive force. A magnetic field is formed in the direction in which the relay coil 6 is penetrated. In response to this magnetic field, the power receiving coil 33 is magnetically coupled to the relay coil 6. The second magnetic body 72 is disposed below the power receiving coil 33. As a result, the magnetic coupling between the power receiving coil 33 and the relay coil 6 is enhanced. Accordingly, the relay coil 6 and the power receiving coil 33 can be strongly magnetically coupled even without disposing a magnetic body on the back side (flying object 3 side) of the power receiving coil 33. The power receiving coil 33 and the relay coil 6 can be strongly magnetically coupled even without providing a magnetic body on the flying object 3. An induced electromotive force is generated in the power receiving coil 33, and the battery 35 is charged via the charging circuit 34.

By providing the relay coil 6, it is possible to generate an induced electromotive force in the power receiving coil 33 and supply electric power to the flying object 3 using the magnetic field generated from the power transmission coil 5 without providing a magnetic body on the back side of the power receiving coil 33. As a result, it is not necessary to install a magnetic body for magnetic coupling in the flying object 3. Accordingly, the weight of the flying object 3 can be reduced.

The power feeding device 2 and the power feeding system 1 of the present disclosure are provided with the relay coil 6 in the power feeding unit 4. As a result, the power receiving coil 33 can be magnetically coupled to the power transmission coil 5 via the relay coil 6. The power feeding device 2 and the power feeding system 1 include the second magnetic body 72 magnetically coupling the relay coil 6 to the power receiving coil 33. As a result, the magnetic coupling between the relay coil 6 and the power receiving coil 33 is enhanced, and thus a decline in power feeding efficiency can be suppressed. Accordingly, with the power feeding device 2 and the power feeding system 1, a decline in power feeding efficiency can be suppressed and magnetic body installation on the back side of the power receiving coil 33 can be omitted. Accordingly, it is not necessary to install a magnetic body for magnetic coupling in the flying object 3, and thus the weight of the flying object 3 can be reduced.

The relay coil 6 of the power feeding device 2 and the power feeding system 1 of the present disclosure is provided in the power feeding unit 4. As a result, it is possible to avoid an increase in the weight of the flying object 3 attributable to the installation of the relay coil 6. As for the power feeding device 2 and the power feeding system 1, it is not necessary to form a projecting portion protruding upward at the power feeding position of the power feeding unit 4. As a result, the space in the lower portion of the flying object 3 can be used effectively. Accordingly, the operation of moving the flying object 3 to the power feeding position is facilitated. With the power feeding device 2 and the power feeding system 1, the space between the leg portion 32 and the leg portion 32 of the flying object 3 can be used effectively.

In the power feeding device 2 and the power feeding system 1 of the present disclosure, the power receiving coil 33 is disposed on the inner peripheral side of the relay coil 6 in a case where the flying object 3 is positioned at the power feeding position. As a result, the magnetic coupling between the relay coil 6 and the power receiving coil 33 is strengthened, and thus the efficiency of power feeding can be enhanced. The power receiving coil 33 can be configured small as a result of the power feeding efficiency enhancement. Accordingly, the weight of the flying object 3 equipped with the power receiving coil 33 can be reduced.

In the power feeding device 2 and the power feeding system 1 of the present disclosure, the power receiving coil 33, the power transmission coil 5, and the relay coil 6 are coaxially disposed in a case where the flying object 3 is positioned at the power feeding position. As a result of this disposition, the power receiving coil 33 can be strongly magnetically coupled to the power transmission coil 5 via the relay coil 6. As a result, the efficiency of power feeding can be enhanced.

The power feeding target of the power feeding device 2 and the power feeding system 1 of the present disclosure is the flying object 3. Accordingly, the weight of the flying object 3 that flies can be reduced. The kinematical performance of the flying object 3 can be enhanced as a result of the weight reduction. By reducing the weight of the flying object 3, the flight duration of the flying object 3 can be extended.

The power feeding device 2 and the power feeding system 1 of the present disclosure have been described. The power feeding device and the power feeding system of the present disclosure are not limited to the embodiment described above. The power feeding device 2 and the power feeding system 1 of the present disclosure can be modified in various ways without departing from the gist of the description of the claims.

Figure 5:
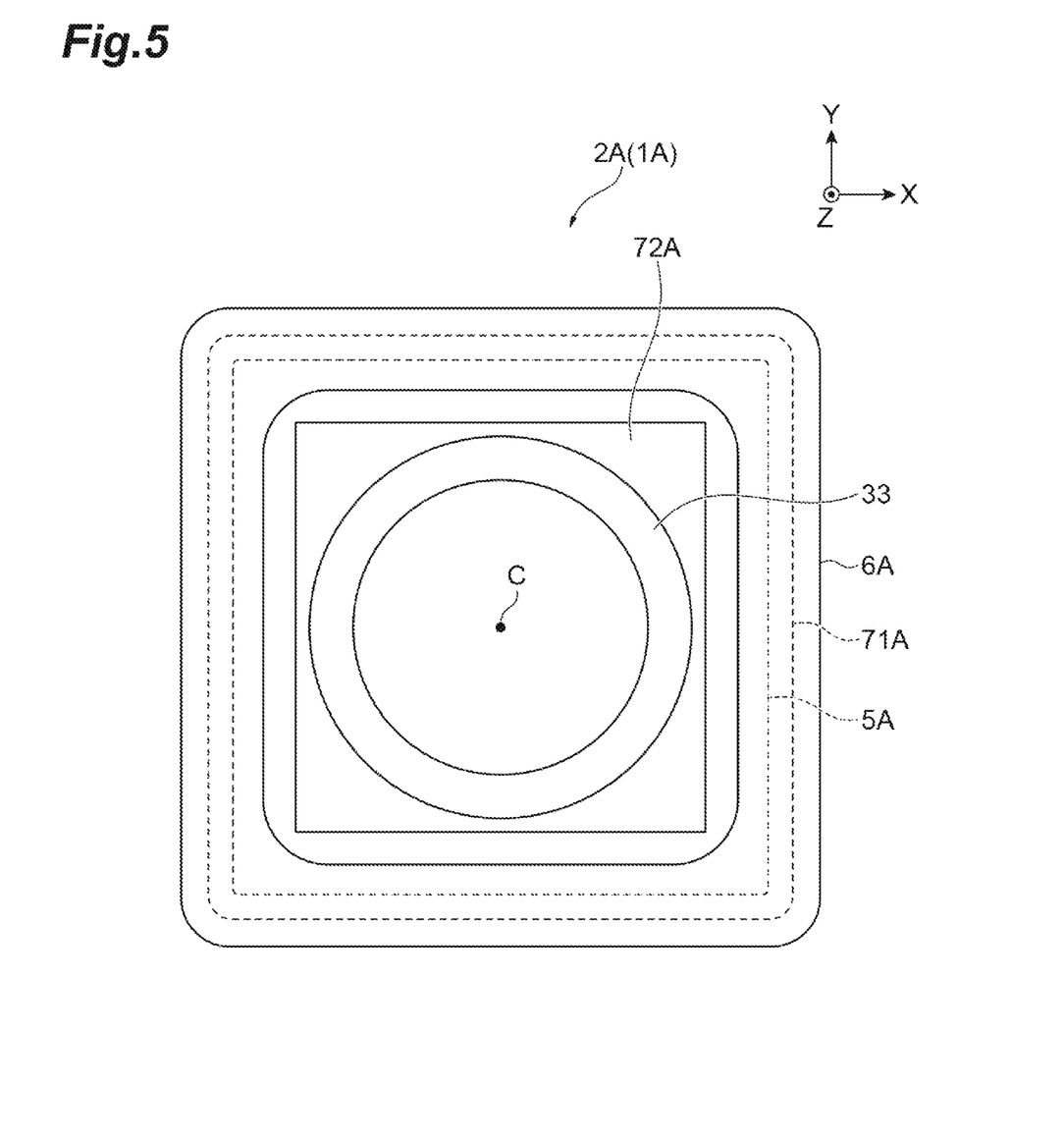
FIG. 5 is a diagram illustrating a modification example of the power feeding device and the power feeding system of the present disclosure.

For example, as illustrated in FIGS. 2 and 3, the outer edges of the power transmission coil 5, the relay coil 6, the power receiving coil 33, the first magnetic body 71, and the second magnetic body 72 of the embodiment are circular. Alternatively, the outer edges of the power transmission coil 5, the relay coil 6, the power receiving coil 33, the first magnetic body 71, and the second magnetic body 72 may not be circular. For example, the outer edges of one or more of the power transmission coil 5, the relay coil 6, the power receiving coil 33, the first magnetic body 71, and the second magnetic body 72 may have a non-circular shape. Specifically, the outer edge of the power receiving coil 33 of a modification example may be circular as illustrated in FIG. 5. The outer edges of a power transmission coil 5A, a relay coil 6A, a first magnetic body 71A, and a second magnetic body 72A may be rectangular or substantially rectangular. Even with a power feeding device 2A and a power feeding system 1A as described above, the same action and effect as those of the embodiment described above can be obtained.

Figure 6:
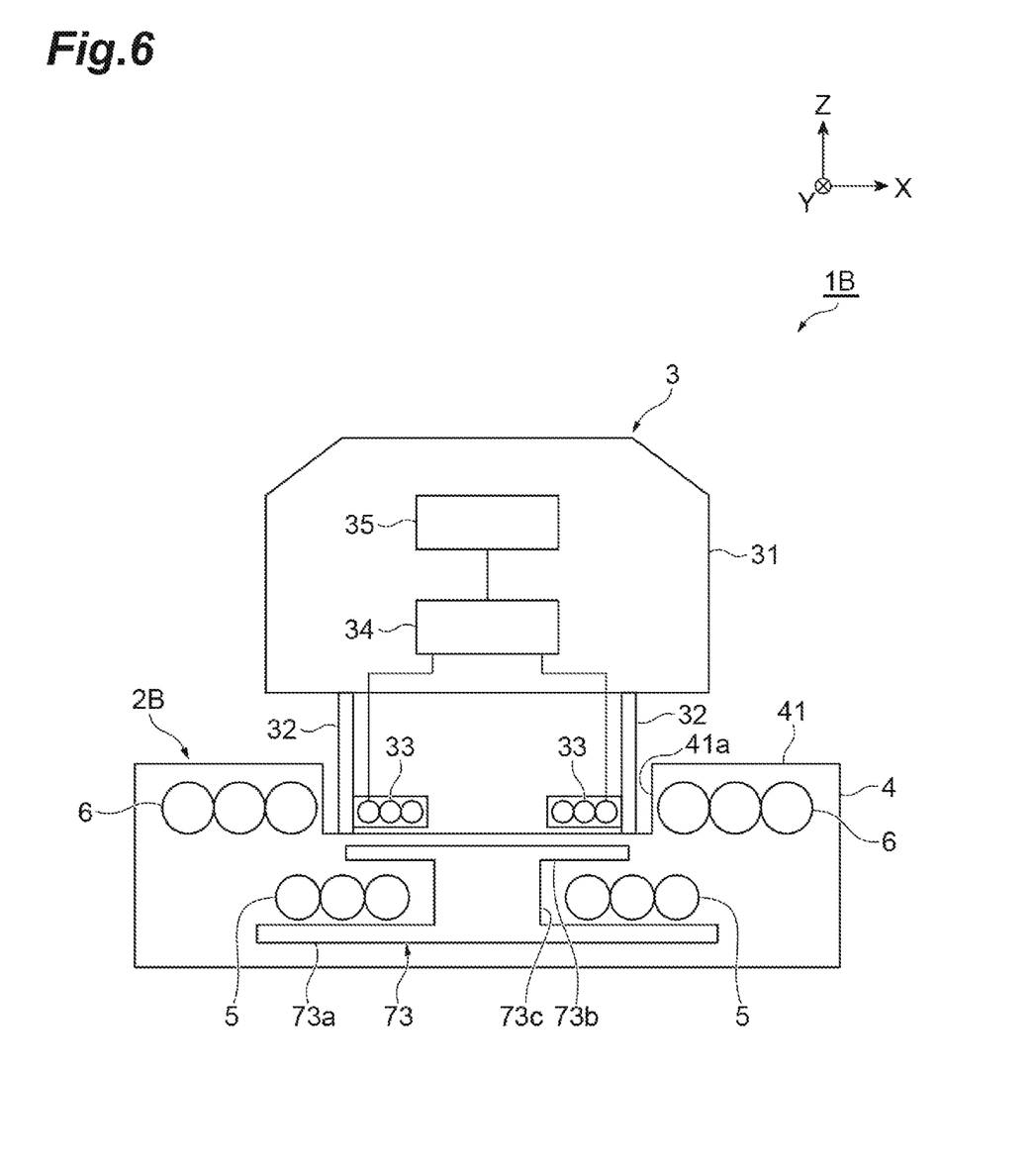
FIG. 6 is a diagram illustrating a modification example of the power feeding device and the power feeding system of the present disclosure.

The power feeding device and the power feeding system of the modification example include the first magnetic body 71 and the second magnetic body 72 as magnetic bodies for magnetic coupling of the power transmission coil 5, the relay coil 6, and the power receiving coil 33. Alternatively, the first magnetic body 71 and the second magnetic body 72 may be an integrated magnetic body. For example, as illustrated in FIG. 6, a power feeding device 2B of a power feeding system 1B of a modification example may include a magnetic body 73 in which a first magnetic portion 73a and a second magnetic portion 73b are connected. The first magnetic portion 73a may be provided on the back side of the power transmission coil 5. The second magnetic portion 73b may be provided between the power transmission coil 5 and the power receiving coil 33. The middle portion of the first magnetic portion 73a may be connected to the middle portion of the second magnetic portion 73b by a connecting portion 73c. Even in this case, the same action and effect as those of the embodiment described above can be obtained.

Figure 7:
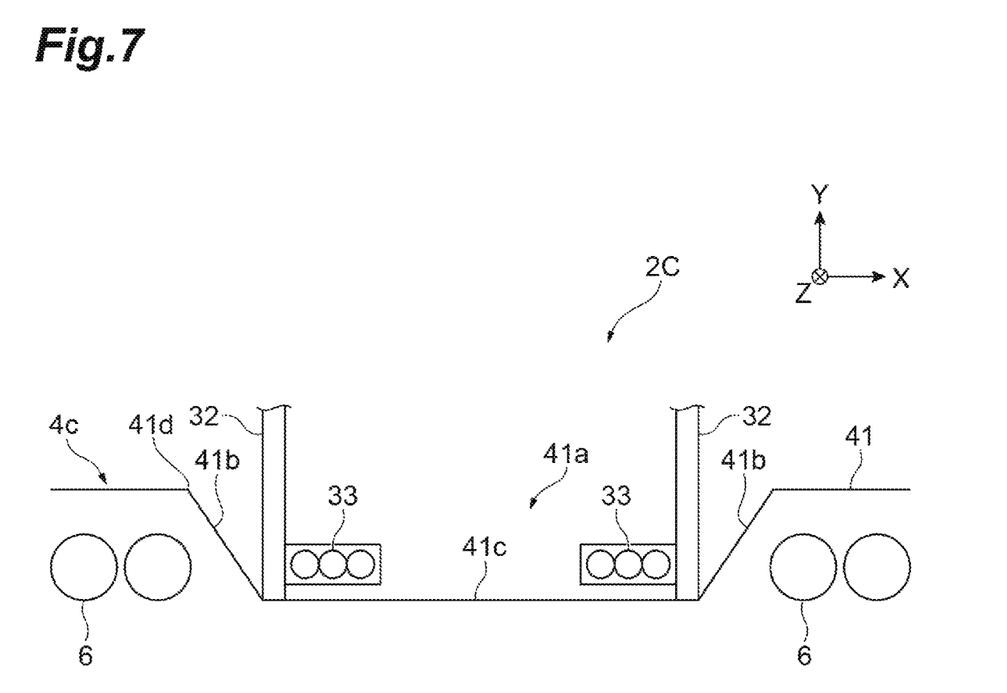
FIG. 7 is a diagram illustrating a modification example of the power feeding device and the power feeding system of the present disclosure.

The recessed portion 41a of the power feeding unit 4 of the embodiment has a vertically recessed shape. Alternatively, the side wall of the recessed portion 41a may be an inclined surface 41b. For example, as illustrated in FIG. 7, the side wall of the recessed portion 41a of a power feeding unit 4C by which a power feeding device 2C of a modification example is configured may be the inclined surface 41b. The inclined surface 41b is inclined such that the horizontal cross section of the recessed portion 41a becomes smaller toward a bottom surface 41c. In this case, the area of an opening 41d of the recessed portion 41a is larger than the area of the bottom surface 41c. As a result, the flying object 3 can be guided to the power feeding position by the inclined surface 41b even if the flying object 3 that flies is out of the power feeding position in landing. Accordingly, the operation of landing the flying object 3 is facilitated.

The recessed portion 41a may be provided with a drainage pipe in a case where the power feeding unit 4 is installed outdoors. For example, a pipe leading from the bottom of the recessed portion 41a to the outside of the power feeding unit 4 may be provided. Rainwater accumulated at the bottom of the recessed portion 41a can be discharged through this pipe.

The upper surface 41 of the power feeding unit 4 of the embodiment has the recessed portion 41a. The upper surface 41 of the power feeding unit 4 of a modification example may lack the recessed portion 41a. The upper surface 41 of the power feeding unit 4 of the modification example may be an even and flat surface. In this case, the upper surface 41 is even. As a result, rainwater accumulation on the upper surface 41 can be suppressed. It is possible to suppress, for example, dust or dirt accumulation on the upper surface 41. Accordingly, the maintenance of the power feeding unit 4 is facilitated. By the upper surface 41 being flat, the flying object 3 may be positioned laterally away from an appropriate power feeding position and the efficiency of power feeding may decline. In this case, the front, rear, left, and right positions are fine-tuned after the flying object 3 is landed on the upper surface 41 to appropriately position the flying object 3 at the power feeding position. As a result, power feeding can be performed efficiently.

A case where the power feeding target is the flying object 3 has been described in the embodiment. Alternatively, the power feeding target may be a movable object different from the flying object 3. For example, the power feeding target may be a vehicle moving on land or an underwater robot moving underwater. The power feeding target may be an object carried by a person such as a smartphone. In this case, the weight of the power feeding target that is carried can be reduced. Accordingly, the power feeding target is handled with ease.

REFERENCE SIGNS LIST

1: power feeding system, 2: power feeding device, 3: flying object, 4: power feeding unit, 5: power transmission coil, 6: relay coil, 31: main body, 32: leg portion, 33: power receiving coil, 34: charging circuit, 35: battery, 41: upper surface, 41a: recessed portion, 41b: inclined surface, 71: first magnetic body, 72: second magnetic body, 81: power transmission circuit, C: axis.

What is claimed is:

1. A power feeding device performing wireless power feeding to a power feeding target, the power feeding device comprising:
    a power feeding unit performing power feeding to the power feeding target disposed at a power feeding position;
    a power transmission coil provided in the power feeding unit and generating a magnetic field by energization;
    a relay coil provided in the power feeding unit, receiving the magnetic field generated from the power transmission coil and magnetically coupled to the power transmission coil, and magnetically coupled to a power receiving coil provided in the power feeding target in a case where the power feeding target is positioned at the power feeding position; and
    a magnetic body provided in the power feeding unit and used for magnetic coupling between the relay coil and the power receiving coil,
    wherein the magnetic body is not provided between the power transmission coil and the relay coil.

2. The power feeding device according to claim 1, wherein the power receiving coil is formed smaller than the relay coil and is disposed on an inner peripheral side of the relay coil in a case where the power feeding target is positioned at the power feeding position.

3. The power feeding device according to claim 1, wherein the power transmission coil and the relay coil are provided coaxially and the power receiving coil, the power transmission coil, and the relay coil are coaxially disposed in a case where the power feeding target is positioned at the power feeding position.

4. The power feeding device according to claim 1, wherein the power feeding target is a flying object.

5. The power feeding device according to claim 1 wherein the power feeding unit includes a guide to guide the power feeding target to the power feeding position.

6. The power feeding device according to claim 1 wherein:
    in a case where the power feeding target is positioned at the power feeding position, both the power transmission coil and the relay coil magnetically coupled to a power receiving coil provided in the power feeding target such that a coupling coefficient between the power receiving coil and the relay coil is larger than a coupling coefficient between the power receiving coil and the power transmitting coil.

7. The power feeding device according to claim 1 wherein a second magnetic body is provided in the power feeding unit and used for magnetic coupling between the power coil and the power receiving coil in the case where the power feeding target is positioned at the power feeding position.

8. A power feeding system performing wireless power feeding to a power feeding target, the power feeding system comprising:
    a power receiving coil provided in the power feeding target;
    a power feeding unit performing power feeding to the power feeding target disposed at a power feeding position;
    a power transmission coil provided in the power feeding unit and generating a magnetic field by energization;
    a relay coil provided in the power feeding unit, receiving the magnetic field generated from the power transmission coil and magnetically coupled to the power transmission coil, and magnetically coupled to a power receiving coil provided in the power feeding target in a case where the power feeding target is positioned at the power feeding position; and
    a magnetic body provided in the power feeding unit and used for magnetic coupling between the relay coil and the power receiving coil,
    wherein the magnetic body is not provided between the power transmission coil and the relay coil.

9. The power feeding device according to claim 8 wherein:
    in a case where the power feeding target is positioned at the power feeding position, both the power transmission coil and the relay coil magnetically coupled to a power receiving coil provided in the power feeding target such that a coupling coefficient between the power receiving coil and the relay coil is larger than a coupling coefficient between the power receiving coil and the power transmitting coil.

10. The power feeding device according to claim 8 wherein a second magnetic body is provided in the power feeding unit and used for magnetic coupling between the power coil and the power receiving coil in the case where the power feeding target is positioned at the power feeding position.

11. A power feeding device performing wireless power feeding to a power feeding target, the power feeding device comprising:
    a power feeding unit performing power feeding to the power feeding target disposed at a power feeding position;
    a power transmission coil provided in the power feeding unit and generating a magnetic field by energization;
    a relay coil provided in the power feeding unit, receiving the magnetic field generated from the power transmission coil and magnetically coupled to the power transmission coil, and magnetically coupled to a power receiving coil provided in the power feeding target in a case where the power feeding target is positioned at the power feeding position; and
    a magnetic body provided in the power feeding unit and used for magnetic coupling between the relay coil and the power receiving coil;
    wherein:
        the power feeding unit includes a guide to guide the power feeding target to the power feeding position,
        the power feeding unit comprises a housing to contain the power transmission coil, the relay coil, and the magnetic body, the housing includes a main surface where the power feeding supply target is to be disposed, the main surface includes a recessed portion, and a bottom surface of the recessed portion includes the power feeding position.

12. The power feeding device according to claim 11, wherein the recessed portion is surrounded by a side wall, and the side wall includes an inclined surface inclined such that a horizontal cross-sectional area of the recessed portion is smaller toward the bottom surface.

13. The power feeding device according to claim 11 wherein:

in a case where the power feeding target is positioned at the power feeding position, both the power transmission coil and the relay coil magnetically coupled to a power receiving coil provided in the power feeding target such that a coupling coefficient between the power receiving coil and the relay coil is larger than a coupling coefficient between the power receiving coil and the power transmitting coil.

14. The power feeding device according to claim 11 wherein a second magnetic body is provided in the power feeding unit and used for magnetic coupling between the power coil and the power receiving coil in the case where the power feeding target is positioned at the power feeding position.

* * * * *